United States Patent Office 3,702,313
Patented Nov. 7, 1972

3,702,313
PROCESS FOR THE PRODUCTION OF
POLYAMIDE FOAMS
Heinrich Gilch and Kurt Schneider, Krefeld-Bockum, and Hermann Schnell, Krefeld-Uerdingen, Germany, assignors to Farbenfabriken Bayer Aktiengesellschaft, Leverkusen, Germany
No Drawing. Filed Oct. 11, 1968, Ser. No. 766,975
Claims priority, application Germany, Oct. 20, 1967,
F 53,842
Int. Cl. C08j 1/18
U.S. Cl. 260—2.5 N     5 Claims

ABSTRACT OF THE DISCLOSURE

Improvement in the process for the production of polyamide foams by activated ionic polymerisation of lactams, in which organosiloxane-hydroxyalkylene block copolymers are added to the polymerisation mixture before polymerisation is started.

---

This invention relates to an improvement in the process for the production of uniform, fine-pored polyamide foams by adding pore regulators.

It is known that organosiloxane-oxyalkylene block copolymers may be used as pore regulators in the production of polyurethane foams. Many of these compounds are unstable in air, some of them hydrolysing under the influence of atmospheric moisture at temperatures as low as room temperature. In the production of polyamide foams from lactams by activated ionic polymerisation, temperatures in excess of 140° C. are inevitable. With a number of catalyst/activator systems, foaming is carried out at temperatures as high as 200° C. To prepare the lactam anion that initiates polymerisation, the reaction material must be basic. Accordingly, organosiloxane hydroxyalkylene block polymers could not be expected to be stable under the conditions of ionic polymerisation.

It has now surprisingly been found that the addition of small quantities of organosiloxane oxyalkylene block copolymers during the ionic polymerisation of lactams in the presence of activators and catalysts, accompanied by foaming considerably reduces the pore size of the resulting polyamide foams and standardises the pore size distribution.

It is an object of this invention to provide an improvement in the production of polyamide foams by activated ionic polymerisation of lactams, which comprises adding an organosiloxane alkyleneoxide block copolymer to the polymerisation mixture and polymerising the mixture thus obtained to yield a uniform and fine pored polyamide foam, said polymerisation mixture comprising a lactam, an activator and a basic catalyst.

When strong bases are used as catalysts, for example sodium lactam or sodium borohydride, polymerisation is disturbed when applying concentrations above 0.3% by weight of the organosiloxane-alkyleneoxide block copolymers. In the presence of strong bases as catalysts the organosiloxane-alkyleneoxide block copolymers are preferably used in concentrations of from 0.005 to 0.1% by weight, based on the polymerisation mixture. In the presence of weak bases as catalysts, for example alkali metal salts of carboxylic acids, the organosiloxane-hydroxyalkylene block copolymers may be used in even higher concentrations, for example in quantities of up to 5% by weight, based on the polymerisation mixture.

Organosiloxane oxyalkylene block copolymers that are suitable for use as pore regulators according to the present invention are those which are described in British patent specification No. 923,403.

Especially useful are the compounds having the general formula

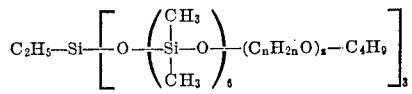

wherein R and R' are hydrocarbon radicals, either aliphatic or aromatic or cycloaliphatic, having from 1 to 8 carbon atoms which may or may not contain one or more functional groups and may be halogen substituted; R" is hydrogen or a hydrocarbon radical, either aliphatic, cycloaliphatic or aromatic, having from 1 to 8 carbon atoms which may contain one or more functional groups and may be halogen substituted; $p$, $q$ and $r$ each have a value of from 2 to 15 and $(C_nH_{2n}O)_z$ is polyoxyalkylene block for example a polyoxypropylene or polyoxybutylene block containing from 10 to 50 oxyalkylene units. Preferably $(C_nH_{2n}O)_z$ is a mixture of oxyethylene and oxypropylene units containing from 17 to 19 oxyethylene units and 11 to 15 oxypropylene units. Preferably, $p$, $q$ and $r$ each have a value of 6.

Most preferably a compound of the formula

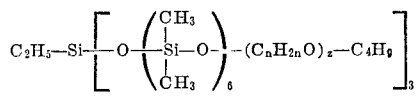

wherein $(C_nH_{2n}O)_z$ represents 17 oxyethylene units and 13 oxypropylene units, is used in the process according to the invention.

The organosiloxane oxyalkylene block copolymers may be added just before polymerisation in so-called one-pot foaming in which the components are together heated to the reaction temperatures. They may, however, also be incorporated into foaming mixtures which are stored for prolonged periods before use. When foaming is carried out by the two-pot process, it is of advantage to add the pore regulator either to the activator-lactam melt or to the catalyst-lactam melt.

The following compounds may be used as activators for the ionic polymerisation reaction: N-acyl-lactams such as N-acetylcaprolactam and N-carboalkoxycaprolactam; isocyanates such as hexamethylene diisocyante and phenyl isocyanate; and isocyanate adducts with lactams such as hexamethylene-6, 6-bis-carbamidocaprolactam, preferably isocyanates or isocyanate donors. An excess of isocyanate, or of a compound that volatilises at the reaction temperature, such as dioxan or of a product that gives off gases, such as an azide, may be used as the expanding agent.

The following examples are to further illustrate the invention without limiting it.

EXAMPLE 1

A mixture of 70 g. of caprolactam, 4 g. of hexamethylene diisocyanate, and 0.03 g. of an organosiloxane oxyalkylene block copolymer having the formula

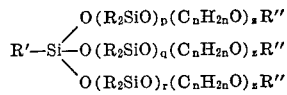

wherein $(C_nH_{2n}O)_z$ represents 17 oxyethylene units and 13 oxypropylene units, is heated to 200° C. A melt of 30 g. of caprolactam and 0.5 g. of sodium borohydride kept at 80 to 100° C., is run into the above mixture with intensive stirring. The stirrer is removed immediately. A fine-pored polyamide foam with a density of 0.10 is formed.

EXAMPLE 2

The procedure is as in Example 1, except that 0.15 g. of the organosiloxane oxyalkylene block copolymer is used. Polymerization does not start.

EXAMPLE 3

A mixture of 100 g. of caprolactam, 4 g. of hexamethylene diisocyanate, 0.75 g. of sodium formate and 0.03 of the organosiloxane oxyalkylene block copolymer of Example is heated with stirring at 200° C. After 2 minutes, a fine-pored foam with a density of 0.25 is formed.

EXAMPLE 4

The procedure is as in Example 3, except that 0.15 g. of the organosiloxane oxyalkylene block copolymers is used. After 2½ minutes, a fine-pored polyamide foam with a density of 0.24 is formed. The foam is not different from that produced in accordance with Example 3, either in its pore size or in its uniformity.

EXAMPLE 5

The procedure is as in Example 1 except that no organosiloxane oxyalkylene block copolymer is used. A coarse-pored polyamide foam with a density of 0.14 is formed. The average pore diameter of the foam is about 10 times greater than in Example 1 and much more irregular.

EXAMPLE 6

The procedure is as in Example 3 except that no organosiloxane oxyalkylene block copolymer is used. The resulting foam has a density of 0.30. The average pore diameter of the polyamide foam is about 15 times greater than in Example 3. The foam is not as uniform as that of Example 3.

What we claim is:

1. In the process for the production of polyamide foams by activated ionic polymerization of caprolactam the improvement which comprises adding an organosiloxane oxyalkylene block copolymer to the polymerization mixture and polymerizing the mixture thus obtained at temperatures in excess of 140° C. to yield a uniform and fine pored polyamide foam, said polymerization mixture comprising a caprolactam, an isocyanate and a basic catalyst selected from the group consisting of sodium lactam, sodium borohydride, and alkali metals salts of carboxylic acids and said block polymer being a compound of the general formula

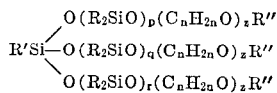

wherein R and R' are aliphatic, aromatic or cycloaliphatic hydrocarbon radicals, having from 1 to 8 carbon atoms, which may contain one or more functional groups and may be halogen substituted; R" is hydrogen or an aliphatic, cycloaliphatic or aromatic hydrocarbon radical, having from 1 to 8 carbon atoms which may contain one or more functional groups and may be halogen substituted; $p$, $q$, and $r$ each have a value of from 2 to 15 and $(C_nH_{2n}O)_z$ is polyoxyalkylene block containing from 10 to 50 oxyalkylene units wherein the said copolymer is added in an amount of 0.005 to 0.1% by weight, based on said polymerization mixture, if said catalyst is sodium lactam or sodium borohydride and said copolymer is added in an amount of 0.005 to 5% by weight based on said polymerization mixture if said catalyst is an alkali metal salt of a carboxylic acid.

2. The process of claim 1, in which said organosiloxane oxyalkylene block copolymer is the compound of the formula

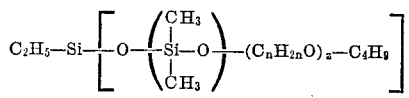

wherein $(C_nH_{2n}O)_z$ represents 17 oxyethylene units and 13 propylene units.

3. The process of claim 1, in which said basic catalyst is sodium borohydride.

4. The process of claim 1, in which said basic catalyst is sodium formate.

5. The process of claim 1, in which said polymerization mixture consists of caprolactam, hexamethylene diisocyanate and sodium borohydride.

References Cited
UNITED STATES PATENTS 3,061,558  10/1962  Alter _____ 260—2.5 P
3,232,892  2/1966  Fisher _____ 260—2.5 N MURRAY TILLMAN, Primary Examiner M. FOELAK, Assistant Examiner U.S. Cl. X.R.

260—78 L